United States Patent [19]

Foster

[11] Patent Number: 5,375,619

[45] Date of Patent: Dec. 27, 1994

[54] PROTECTIVE CIRCUIT FOR PRESSURE AND RETURN

[76] Inventor: Raymond K. Foster, P.O. Box 1, Madras, Oreg. 97741

[21] Appl. No.: 165,638

[22] Filed: Dec. 8, 1993

Related U.S. Application Data

[63] Continuation-in-part of Ser. No. 54,532, Apr. 28, 1993, abandoned.

[51] Int. Cl.$^5$ ............................................. F16K 17/10
[52] U.S. Cl. ..................................... 137/115; 137/109; 137/495; 137/544; 137/557; 137/569; 251/25
[58] Field of Search ............... 137/569, 492.5, 109, 137/115, 495, 544, 557; 251/25, 30.01

[56] References Cited

U.S. PATENT DOCUMENTS

| | | | |
|---|---|---|---|
| 2,571,154 | 10/1951 | Mercier | 137/492.5 X |
| 2,700,397 | 1/1955 | Compton | 137/569 |
| 2,728,547 | 12/1955 | Crookston et al. | 137/492.5 X |
| 3,593,741 | 7/1971 | Odenthal | 137/495 |
| 3,906,994 | 9/1975 | Schön | 137/544 |
| 4,084,604 | 4/1978 | Budecker et al. | 137/115 X |
| 4,179,887 | 12/1979 | Ridder et al. | 137/109 X |
| 4,285,362 | 8/1981 | Taylor | 137/492.5 X |
| 4,625,749 | 12/1986 | Eskildson | 137/115 |
| 4,706,930 | 11/1987 | Lexen | 251/30.01 X |
| 4,748,893 | 6/1988 | Foster | 91/176 |
| 4,848,397 | 7/1989 | Bickford et al. | 137/492.5 X |
| 4,930,313 | 6/1990 | Hayasaki | 137/544 X |
| 4,972,870 | 11/1990 | Changnian et al. | 137/492.5 X |
| 5,103,866 | 4/1992 | Foster | 137/596.15 |
| 5,125,502 | 6/1992 | Foster | 198/750 |
| 5,193,661 | 3/1993 | Foster | 198/750 |
| 5,255,712 | 10/1993 | Foster | 137/522 |

FOREIGN PATENT DOCUMENTS

| | | | |
|---|---|---|---|
| 687505 | 8/1930 | France | 251/30.01 |
| 1093772 | 12/1960 | Germany | 251/30.01 |

Primary Examiner—Stephen M. Hepperle
Attorney, Agent, or Firm—David P. Campbell

[57] ABSTRACT

A protective circuit (40) for pressure and return connections of a hydraulic system. The protective circuit includes a four-way, two-position on/off valve (65) having a first (66), second (68), and third (70) port. In its "off" position, valve (65) connects ports (68, 70) and blocks port (66). In its "on" position, ports (66, 70) are connected and port (68) blocked. A pilot valve (46) is provided including a valve plunger (56) and piston (58), which defines a valve chamber (52) and pilot chamber (54). Valve chamber (52) is connected to pressure and return, while pilot chamber (54) is connected to port (70) of valve (65). A first one-way check valve (96) and second one-way check valve (78) are also provided.

9 Claims, 5 Drawing Sheets

PROTECTIVE CIRCUIT FOR PRESSURE AND RETURN

RELATED APPLICATION

This application is a continuation-in-part of my co-pending patent application Ser. No. 08/054,532, filed Apr. 28, 1993, now abandoned.

TECHNICAL FIELD

This invention relates to a protective circuit for the pressure and return connections of a hydraulic system, and more particularly, to a protective circuit that bypasses the pressure line to the return line should the pressure and return connections to the system be reversed.

BACKGROUND OF THE INVENTION

Hydraulic systems commonly employ pressure and return ports for connection to a hydraulic pressure source and a tank. With these systems, a worker may routinely connect and disconnect pressure and return lines to the pressure and return ports of the hydraulic system. When the pressure and return connections are made properly, the system operates normally, but when the pressure and return connections are inadvertently reversed, the hydraulic system can be severely damaged.

Typically, the hydraulic pressure source itself will include a pressure relief valve for guarding against reversed connections. For example, in a trailer truck having a reciprocating floor conveyor, the hydraulic system of the truck usually includes a relief valve for protecting against reversed connections to the pressure and return lines of the conveyor's hydraulic drive system.

However, the pressure relief valve of the truck's hydraulic system sometimes is set inadvertently too high, and either the conveyor drive system operates in reverse, due to reversed connections, or the system is damaged. The present invention is directed toward alleviating this problem.

SUMMARY OF THE INVENTION

Briefly described, the protective circuit of the present invention comprises a pressure inlet port for connection to a pressure source and a return outlet port for connection to a tank. The system also includes a pressure outlet port for connection to a pressure in port of the hydraulic system being protected and a return inlet port for connection to the return line of the hydraulic system. In the protective circuit, a pressure line extends between the pressure inlet and outlet ports, and a return line extends between the return inlet and outlet ports. A four-way, two-position on/off valve has a first port connected to the pressure line, a second port connected to the return line, and a third port. When the on/off valve is in an "off" position, the second port is connected to the third port and the first port is blocked. When the on/off valve is in an "on" position, the first port is connected to the third port and the second port is blocked. The circuit also includes a pilot valve having a valve chamber and a pilot chamber. Both the valve and pilot chambers are operated by hydraulic pressure to shift the pilot valve between open and closed positions. The valve chamber is connected between the pressure and return lines. The pilot chamber is connected to the third port of the on/off valve. A first one-way check valve is connected between the pressure line and the pilot chamber. The first one-way check valve blocks flow from the pressure line to the pilot chamber through the check valve. A second one-way check valve is in the line between the second port of the on/off valve and the return line. The second one-way check valve blocks flow from the return line to the second port of the on/off valve.

With pressure properly connected to the pressure inlet port and a tank properly connected to the return outlet port, and the on/off valve in an "off" position, the pilot valve opens, due to pressure from the pressure line entering the valve chamber, and fluid bypasses from the pressure line through the pilot valve to the return line. With the on/off valve in an "on" position and the pressure and return connections properly made, the pilot valve closes, due to pressure from the pressure line moving through the on/off valve and entering the pilot chamber, and pressure flows through the pressure line, to the pressure outlet port, and to the hydraulic system.

When the pressure and return connections are reversed and the on/off valve is in an "off" position, the pilot valve opens, due to pressure from the return line entering the valve chamber, and fluid flows from the return line to the pressure line through the pilot valve. When the on/off valve is in an "on" position and the pressure and return connections are reversed, the pilot valve remains in an open position and fluid flows from the return line to the pressure line, and any fluid in the pilot chamber is exhausted through the first one-way check valve in the pressure line.

According to one aspect of the invention, a filter assembly is included in the pressure line. The filter assembly includes a filter and a filter bypass circuit including a check valve for allowing fluid flow around the filter should the filter become blocked. Preferably the filter assembly also includes a bypass indicator for providing an indication when the filter becomes blocked.

According to another aspect of the invention, a pressure relief valve is connected between the pilot chamber of the pilot valve and the return line. The pressure relief valve opens should pressure in the pilot chamber exceed a first predetermined minimum level, and closes should pressure in the return line exceed a second predetermined level.

Preferably, the pilot valve includes a valve plunger mounted on a piston. A compression spring in the pilot chamber biases the piston and valve plunger to a closed position, as does pressure in the pilot chamber. Pressure in the valve chamber biases the valve plunger to an open position. The surface area of the valve piston is greater on the pilot chamber side of the piston than on the valve plunger side of the piston. As a result, equal pressure in both the valve chamber and the pilot chamber biases the valve plunger into a closed position.

Preferably, the components of the protective circuit, including the pilot valve, the on/off valve, and the check valves are housed in a single block material with pressure and return lines bored therein and with sockets machined therein for housing the various components of the circuit.

Other objects, features and advantages of the present invention will become apparent from the following disclosure of the best mode of the invention and accompanying drawings and the claims, all of which are incorporated herein as part of the disclosure of the invention.

BRIEF DESCRIPTION OF THE DRAWINGS

Like reference numerals are used to indicate like parts throughout the various figures of the drawing, wherein.

BEST MODE FOR CARRYING OUT THE INVENTION

Figure 1:
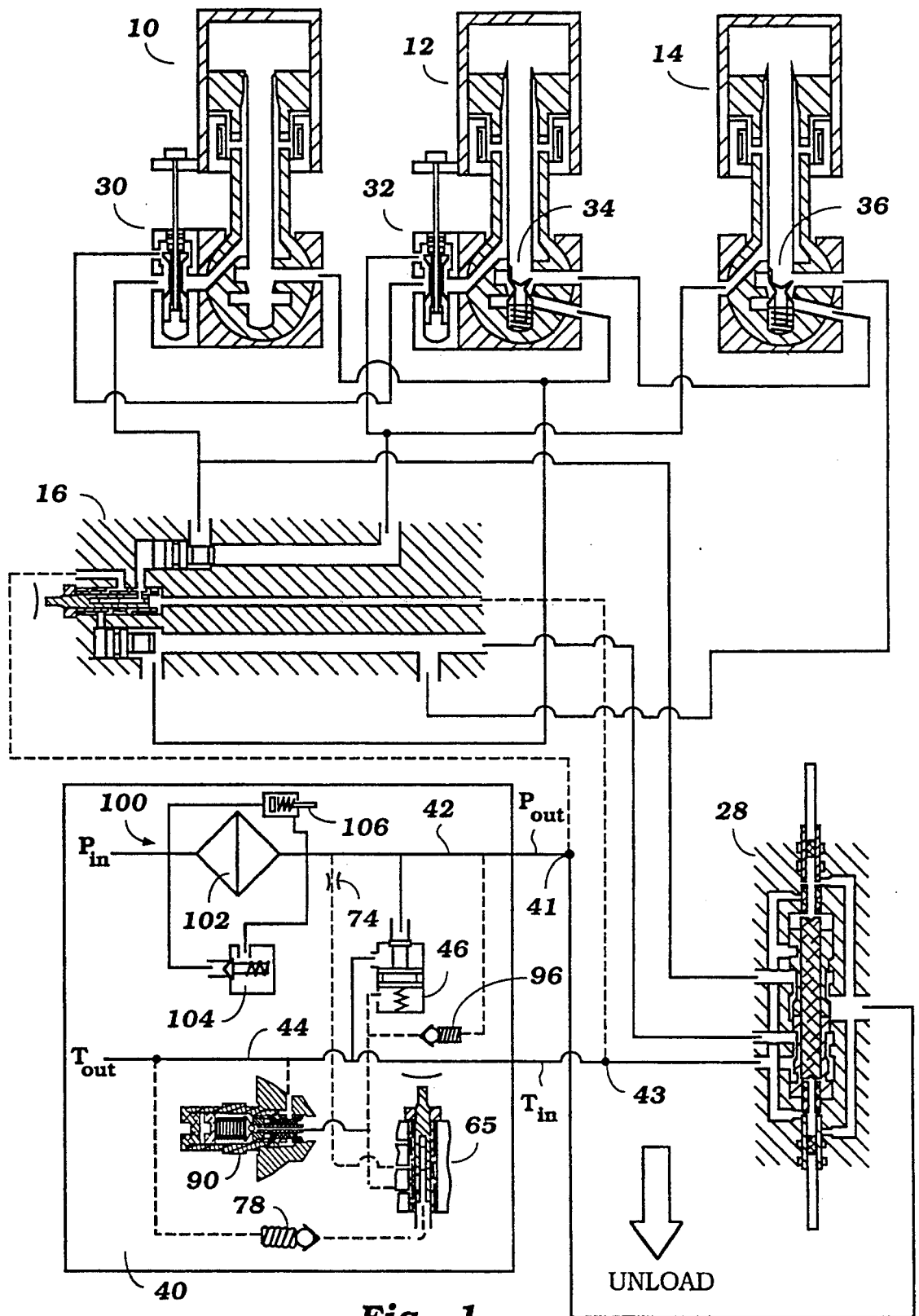
FIG. 1 is a schematic diagram of three linear hydraulic motors and a control system, including the protective circuit of the present invention, for automatically controlling hydraulic fluid pressure to and from the working chambers of the motors.

FIG. 1 shows a system of linear hydraulic motors that is similar to the system shown in my U.S. Pat. No. 5,193,661, granted Mar. 16, 1993. Like the system disclosed in U.S. Pat. No. 5,193,661, the system of FIG. 1 is designed for controlling the floor slats of a reciprocating floor conveyor. In operation, all three piston-cylinder units (also herein referred to as "drive units") 10, 12, 14 are retracted in unison to convey a load. Then, they are extended, one at a time, for returning the floor slats, one-third at a time, to a start position. This sequence is described in my U.S. Pat. No. 5,193,661, and also in my U.S. Pat. No. 5,125,502, granted Jun. 30, 1992, and in my U.S. Pat. No. 4,748,893, granted Jun. 7, 1988.

Referring to FIG. 1, element 16 is a directional control valve. This valve 16 has two positions. In one position, valve 16 directs the drive units 10, 12, 14 to operate in a first direction mode to convey a load in, for example, an unload direction. If the conveyor is in a trailer, the drive units 10, 12, 14 would move the floor slat members in unison towards the rear of the trailer, to unload the cargo in the trailer. When valve 16 is in its second position, it directs drive units 10, 12, 14 to operate in a second direction mode to convey a load in the opposite direction, e.g. to load cargo into the trailer. Valve 16 forms the subject matter of my co-pending application, Ser. No. 08/054,534, filed on Apr. 28, 1993, and entitled, "Directional Control Valve."

Valve 28 is a switching valve. This valve is disclosed in my U.S. Pat. No. 5,103,866, granted Apr. 14, 1992, and entitled, "Poppet Valve and Valve Assemblies Utilizing Same." Valve 28 is also disclosed and described in my U.S. Pat. No. 5,125,502, granted Jun. 30, 1992, and entitled, "Drive Mechanism For A Reciprocating Floor Conveyor." Generally, switching valve 28 switches the pressure and return lines leading to drive units 10, 12, 14.

Valves 30, 32 are "pull" sequencing valves. They function likes valves LV4, LV5, LV6 disclosed in my U.S. Pat. No. 5,193,661. Valves 30, 32 are a valve type that is disclosed in my U.S. Pat. No. 5,255,712, issued Oct. 26, 1993, and entitled, "Check Valve Pull Assembly."

Drive units 12, 14 also include "push" type sequencing valves 34, 36. Valves 34, 36 are a valve type that forms the subject matter of my co-pending application Ser. No. 08/054,530, filed on Apr. 28, 1993, and entitled, "Internal Check Valve."

In preferred form, the drive units 10, 12, 14 include an end-of-stroke cushion that is disclosed in my co-pending application Ser. No. 08/054,531, filed on Apr. 28, 1993, and entitled, "End of Stroke Cushion For A Linear Hydraulic Motor."

The above-identified patents and applications are hereby incorporated herein by this specific reference.

Figure 2:
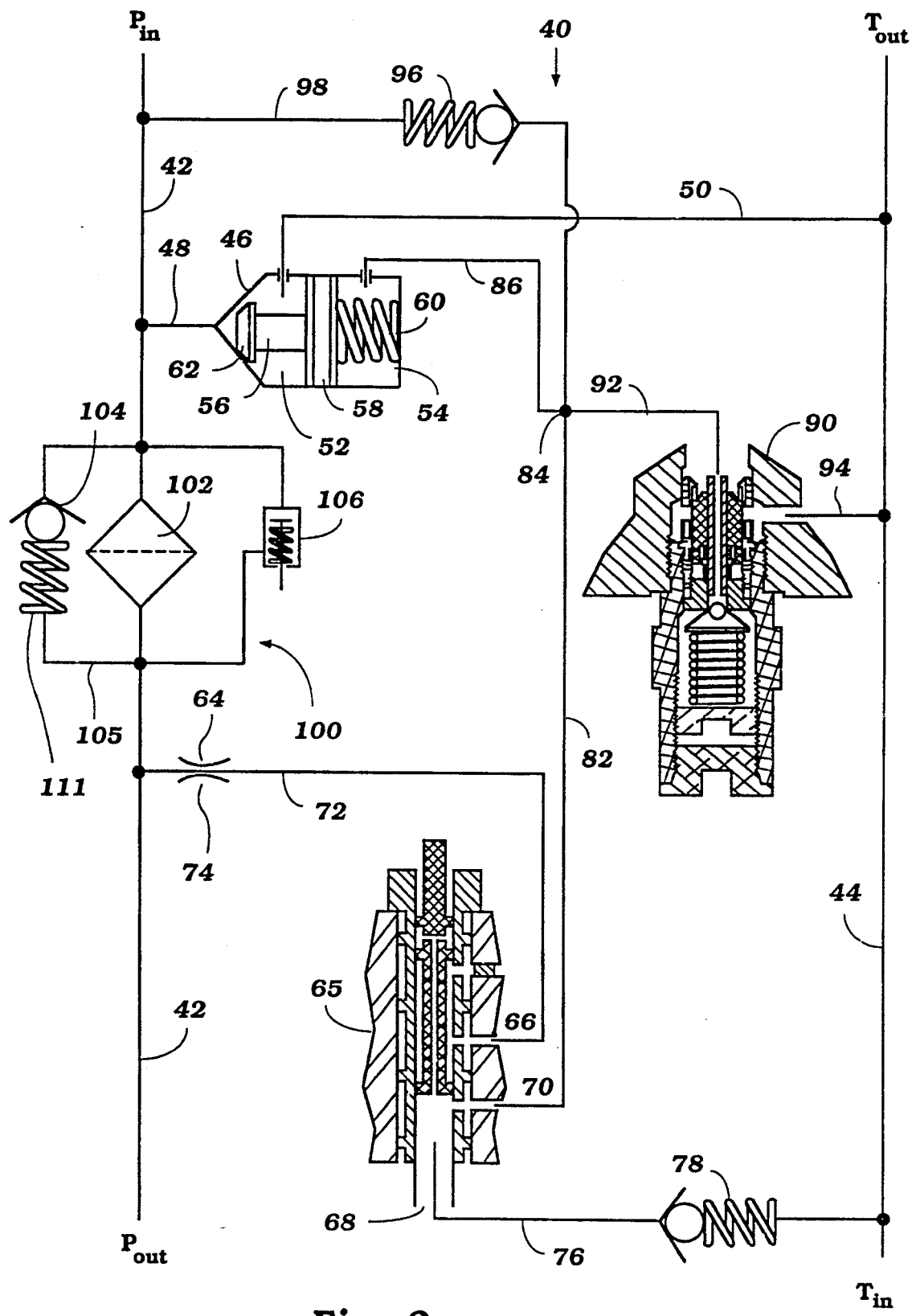
FIG. 2 is a schematic diagram of the protective circuit for the pressure and return connections of the system of FIG. 1.

Referring to FIGS. 1 and 2, in preferred form, "P IN" is the pressure inlet port for the protective circuit 40 of the present invention. Port "T OUT" is the tank or return outlet port for the protective circuit. Port "P OUT" is a pressure outlet port that connects to the pressure in port 41 of the hydraulic system that is being protected. Port "T IN" is a return inlet port that is connected to the return port 43 of the hydraulic system being protected.

In protective circuit 40, a pressure line 42 extends between "P IN" and "P OUT". A return line 44 extends between "T OUT" and "T IN".

A hydraulic actuated pilot valve 46 is connected via lines 48 and 50 between pressure line 42 and return line 44. Pilot valve 46 includes a valve chamber 52 and a pilot chamber 54. A T-shaped valve plunger 56 is disposed within pilot valve 46. A piston head 58 separates valve chamber 52 from pilot chamber 54. A compression spring 60 in pilot chamber 54 biases valve plunger 56 against a valve seat 62. The area of piston head 58 acted on by fluid pressure in pilot chamber 54 is greater than the area of piston head 58 acted on by fluid pressure in valve chamber 52. Thus, if the pressure in valve chamber 52 is equal to the pressure in pilot chamber 54, valve plunger 56 will be biased by spring 60 to a closed position, and flow through lines 48, 50 will be blocked.

A four-way, two-position valve 65 is provided having a first port 66, a second port 68, and a third port 70. Valve 65 functions as an on/off valve and is shown in its "off" position in FIGS. 1 and 2. Line 72 connects pressure line 42 to the first port 66 of valve 65. A restriction 74 is provided in line 72. Second port 68 is connected to return line 44 via line 76. A standard one-way check valve 78 is provided in line 76 and is oriented to block flow from return line 44 to second port 68. Line 82 connects the third port 70 of valve 65 to junction 84. Line 86 connects junction 84 to pilot chamber 54 of pilot valve 46. A standard pressure relief valve 90 is connected between junction 84 and return line 44 via lines 92, 94. Another standard one-way check valve 96 is provided in line 98, which connects junction 84 with pressure line 42. Check valve 96 blocks flow from pressure line 42 to junction 84.

A filter assembly 100 is provided in pressure line 42. The filter assembly 100 includes a filter 102, a filter bypass valve 104, and a bypass indicator 106. If there is an obstruction in filter 102, e.g. the filter element needs to be cleaned or is defective, pressure will be diverted through filter bypass valve 104 via line 105. The pressure will push valve 104 open, in opposition to the force of a bias spring 111. Pressure will then move through bypass valve 104 back to pressure line 42. The system will operate as described above except that the fluid will bypass filter 102 and will thus not be filtered.

Figure 4:
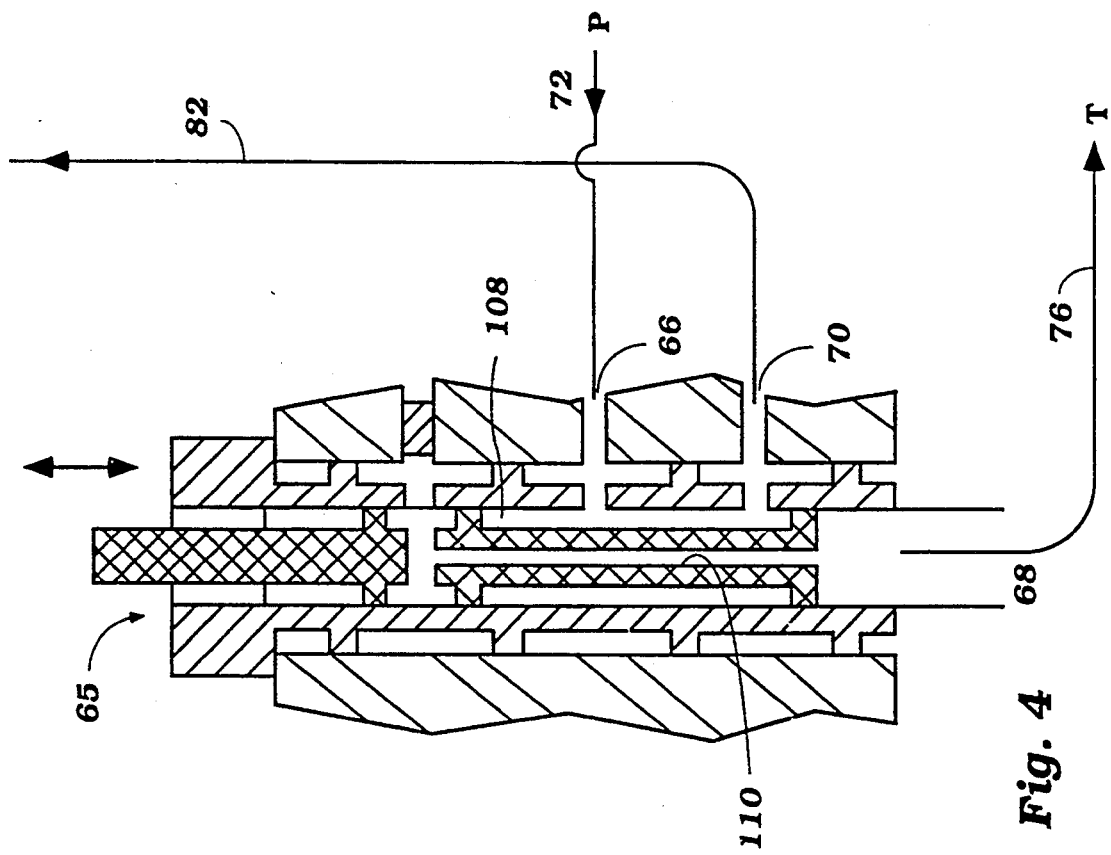
FIG. 4 is a view like FIG. 3, but showing the valve in a second position.
Figure 3:
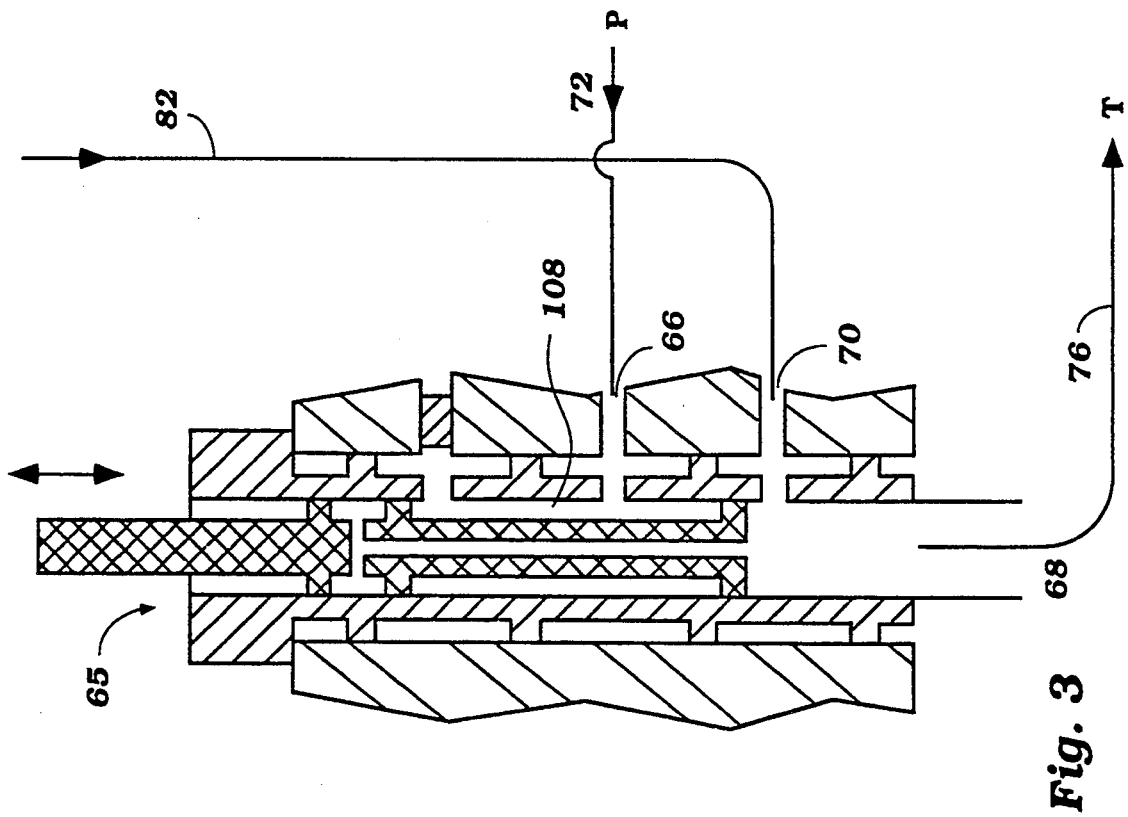
FIG. 3 is a sectional view of the four-way, two-position valve of the protective circuit of FIG. 2, showing the valve in a first position.

In FIG. 3, the four-position, two-way valve 65 is shown in a first "off" position. In this position, line 72, connected to first port 66, is blocked via passageway 108. Line 76, connected to second port 68, is connected to line 82 through third port 70. In FIG. 4, on/off valve 65 is shown in a second "on" position. In this position, line 82 is connected to line 72 via passageway 108, and line 76 is blocked via passageway 110.

Figure 5:
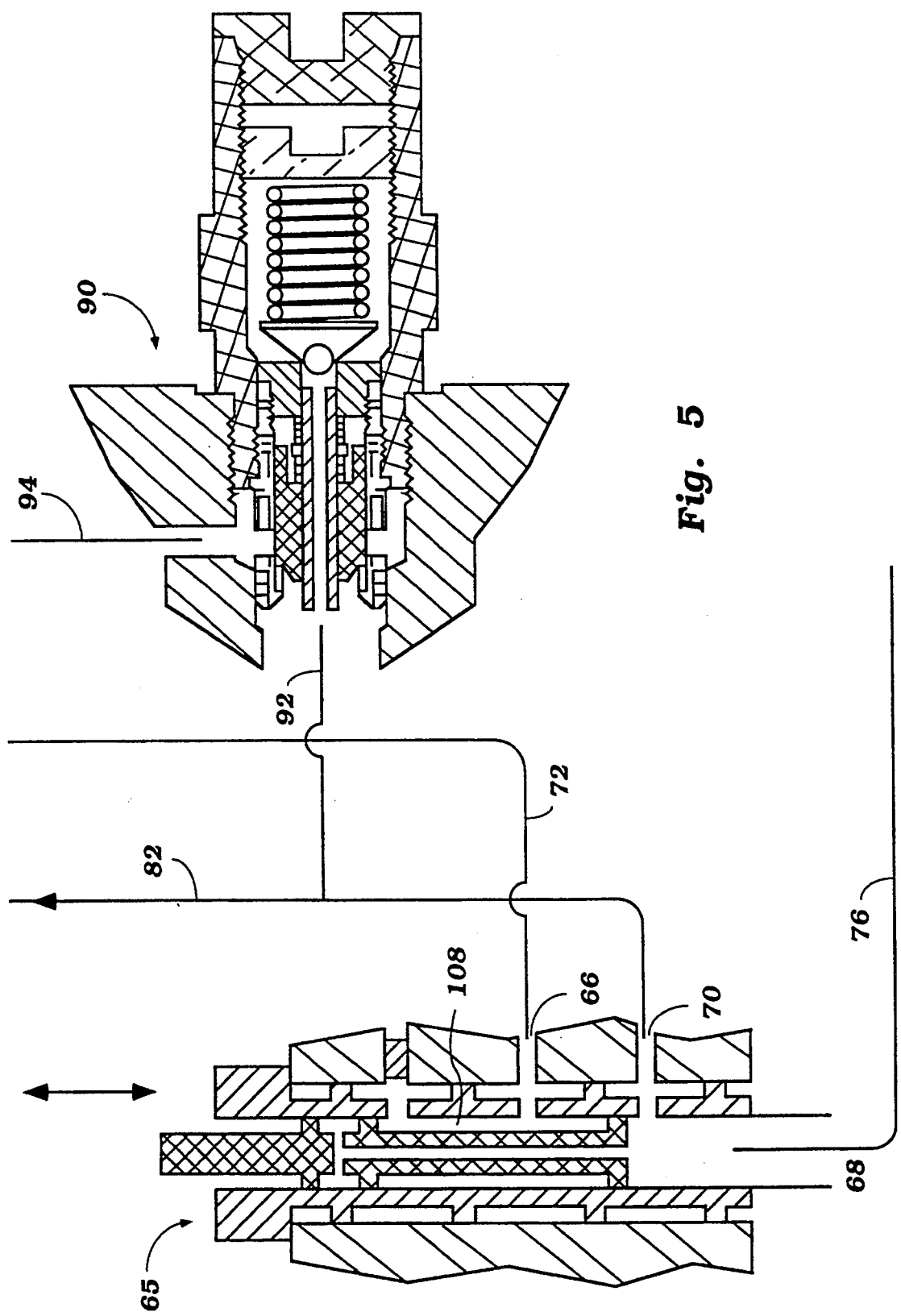
FIG. 5 is a partial view of the protective circuit of FIG. 2, presenting an enlarged scale view of the relief valve.

In FIG. 5, there is shown a standard pressure relief valve 90. The purpose of relief valve 90 is to prevent damage to the hydraulic system in the event that the hydraulic pressure supplied by the pump becomes too great or climbs beyond a predetermined level. Leaking of relief valve 90 due to excess pressure will allow fluid to flow from passageway 92 to passageway 94, thereby bypassing the remainder of the hydraulic system and porting high pressure to tank T. Due to the present invention, however, it is not necessary that the entire flow of fluid pass through relief valve 90 to affect this bypass. Instead, the connection of passageway 82 through valve 90 to line 94 causes a sufficient drop in pressure in pilot chamber 54 of valve 46, causing valve plunger 56 to open and allowing pressure flow through line 48 to line 50.

In operation, with port "P IN" properly connected to pressure and on/off valve 65 in an "off" position, pressure will enter lines 42, 98. Check valve 96 will prevent flow through line 98. Pressure in line 42 will enter line 48 and exert pressure on the end of valve plunger 56 of valve 46. This will push piston 58 open because pilot chamber 54 is connected to return pressure via valve 65. Opening of valve 46 allows pressure movement through line 48, through valve 46, and into line 50, to return line 44. Spring 60 is insufficient to overcome the force of the pressure in valve chamber 52, and thus cannot keep valve plunger 56 in its closed position. Pilot chamber 54 is connected by line 86 and line 82 to the third port 70 of on/off valve 65. In its first position, on/off valve 65 connects line 70 to line 76 and line 76 to return line 44. Thus, pilot chamber 54 is connected to return line 44.

When pressure is connected to "P IN" and "T OUT" is connected to tank, and valve 65 is switched to its second "on" position, line 72 is connected to line 82 via valve 65. Pressure in line 42 will move through the filter assembly 100 through restriction 74 and line 72, into line 82, and through junction 84 and line 86 into pilot chamber 54. The pressure in pilot chamber 54 adds force to spring 60, and valve plunger 56 is moved to a closed position. The pressure from line 42 and line 48 acting against the valve plunger 56 in valve chamber 52 is insufficient to overcome the pilot chamber pressure and force of spring 60, due to the different areas of the piston 58 acted upon by pressure in the respective chambers. As a result, valve plunger 56 remains closed. This stops the short circuiting of pressure through line 48 to line 50 and return line 44. As a result, pressure flows through pressure line 42 to the pressure outlet port "P OUT" and to the hydraulic system.

In the event of a connection of pressure to port "T OUT" and a connection of port "P IN" to tank, with valve 65 in its closed or "off" position, the pressure will be bypassed through pilot valve 46. Pressure from return line 44 will enter lines 50, 94, and 76. Check valve 78 will block pressure through line 76. Pressure in line 94 will close relief valve 90. Pressure in line 50 will enter valve chamber 52 and move the valve plunger 56 to its open position. Fluid in pilot chamber 54 will be exhausted to pressure line 42 through line 86 and line 98 through check valve 96. The opening of valve 56 will result in the pressure in line 50 moving through line 48 to the pressure line 42. Thus, the pressure is bypassed or shunted from return line 44 to pressure line 42.

When the "P IN" port is incorrectly connected to tank and the "T OUT" port is incorrectly connected to pressure, and valve 65 is moved to its second or "on" position, the protective circuit will continue to bypass pressure. Pressure is blocked through line 76. Relief valve 90 is closed and pressure moving through line 50 and through pilot valve 46 into line 48, moves through pressure line 42, through filter assembly 100 and into line 72. From line 72, pressure moves through valve 65 into line 82 and into pilot chamber 54. Thus, the only consequence is that valve 56 is connected at both of its ends to lines leading back to tank. As a result, pressure will continue to be bypassed from line 44, through line 50 and then through line 48, to line 42 back to tank. An operator will be informed of this bypassing or short circuiting of the hydraulic circuit that the pressure and return lines are switched.

Figure 6:
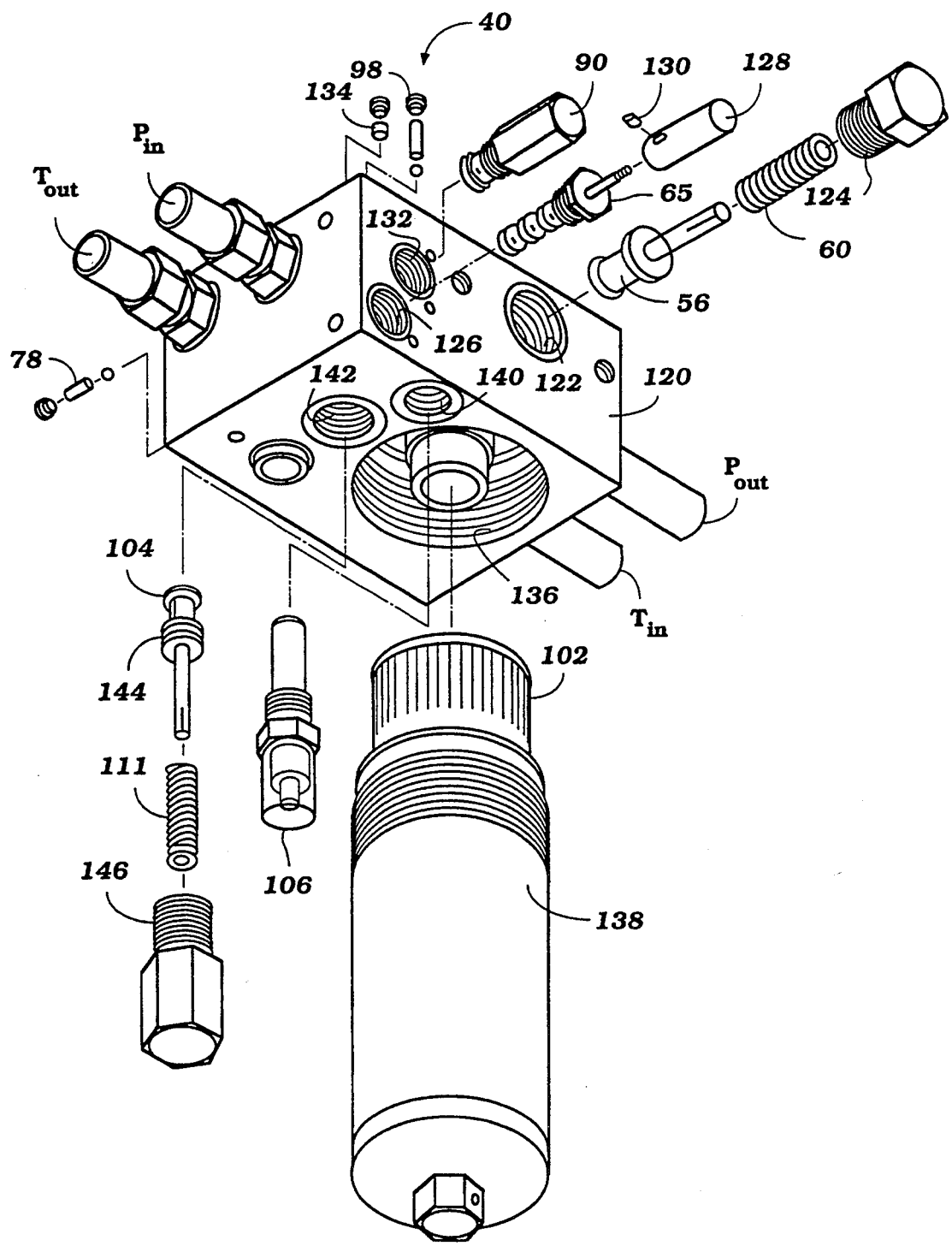
FIG. 6 is an exploded view of the protective circuit assembly of FIG. 2.

FIG. 6 illustrates the protective circuit assembly 40 of the present invention. The assembly 40 includes a rectangular housing 120. Housing 120 includes a pair of longitudinal bores for ports "P IN", "T OUT", "P OUT", and "T IN." Housing 120 includes a bore 122 for valve 56, spring 60, and a bypass end cap 124. Another bore 126 is provided for on/off valve 65 and an on/off bushing 128 and set screw 130. Central bore 132 is provided for relief valve 90. Bores also are provided for check valves 98 and 78. Also, orifice 134 is provided. On the underside of housing 120, a filter cavity 136 is provided for receiving filter 102. Filter 102 is mounted to a filter canister 138. Bore 140 is provided for filter indicator 106. Bore 142 is provided for filter bypass valve 104, which includes a valve assembly 144, spring 111 and an end cap 146.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalence and reversal of parts.

What is claimed is:

1. A protective circuit for a hydraulic system comprising:
   a pressure inlet port for connection to a pressure source;
   a return outlet port for connection to tank;
   a pressure outlet port for connection to a pressure in port of the hydraulic system;
   a return inlet port for connection to the return line of the hydraulic system;
   a pressure line extending between the pressure inlet and outlet ports;
   a return line extending between the return inlet and outlet ports;
   a four-way, two-position on/off valve having a first port connected to the pressure line, a second port connected to the return line, and a third port;
   wherein when the on/off valve is in an "off" position, the second port is connected to the third port and the first port is blocked, and when the on/off valve is in an "on" position, the first port is connected to the third port and the second port is blocked;

a pilot valve including a valve chamber and a pilot chamber, operated by hydraulic pressure to shift the pilot valve between open and closed positions, the valve chamber being connected between the pressure and return lines, the pilot chamber being connected to the third port of the on/off valve;

a first one-way check valve connected between the pressure line and the pilot chamber, the first one-way check valve blocking flow from the pressure line to the pilot chamber through the check valve;

a second one-way check valve in the line between the second port of the on/off valve and the return line, the second one-way check valve blocking flow from the return line to the second port;

whereby, with a pressure supply connected to the pressure inlet port and a return line connected to the return outlet port, and the on/off valve in an "off" position, the pilot valve opens due to pressure from the pressure line entering the valve chamber and fluid bypasses from the pressure line through the pilot valve to the return line, and with the on/off valve in an "on" position, the pilot valve is in a closed position due to pressure entering the pilot chamber, and pressure flows through the pressure line to the pressure outlet port;

and whereby with the pressure supply connected to the return outlet port and the return line connected to the pressure inlet port, and with the on/off valve in an "off" position, the pilot valve opens and fluid flows from the return line to the pressure line through the pilot valve, and with the on/off valve in an "on" position, the pilot valve remains in an open position and fluid flows from the return line to the pressure line, and any fluid in the pilot chamber is exhausted through the first one-way check valve to the pressure line.

2. The protective circuit of claim 1, and further comprising a filter assembly in the pressure line, the filter assembly including a filter and a filter bypass circuit including a check valve for allowing fluid flow around the filter should the filter become blocked.

3. The protective circuit of claim 2, wherein the filter assembly also includes a bypass indicator for providing an indication when the filter becomes blocked.

4. The protective circuit of claim 1, and further comprising a pressure relief valve connected between the pilot chamber and the return line.

5. The protective circuit of claim 4, wherein the pressure relief valve is adapted to open should pressure in the pilot chamber exceed a first predetermined level, and to close should pressure in the return line exceed a second predetermined level.

6. The protective circuit of claim 1, wherein the pilot valve includes a valve plunger mounted on a piston, the piston biased by a spring in the pilot chamber to move the valve plunger to a closed position.

7. The protective circuit of claim 6, wherein the valve plunger, in its closed position, blocks flow through the valve chamber, and wherein the valve plunger is subject to fluid pressure in the pressure line and the valve chamber side of the piston is subject to fluid pressure in the return line, so that fluid pressure in either the pressure or return lines can open the pilot valve and bypass pressure between the pressure and return lines.

8. The protective circuit of claim 7, wherein the area of the piston subject to pressure in the valve chamber is less than the area of the piston subject to pressure in the pilot chamber.

9. The protective circuit of claim 1, wherein the components of the protective circuit are housed in a single block material with pressure and return lines bored therein and with sockets machined therein for housing the various components of the circuit.

* * * * *